US007261198B2

(12) United States Patent
Tatar et al.

(10) Patent No.: US 7,261,198 B2
(45) Date of Patent: Aug. 28, 2007

(54) BI-DIRECTIONAL PACKAGE DIVERT MECHANISM AND METHOD OF USE

(75) Inventors: Christopher J. Tatar, Endicott, NY (US); Shane F. Mills, Nichols, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 178 days.

(21) Appl. No.: 10/076,347

(22) Filed: Feb. 19, 2002

(65) Prior Publication Data

US 2003/0155213 A1 Aug. 21, 2003

(51) Int. Cl.
*B65G 47/22* (2006.01)

(52) U.S. Cl. .......................... 198/370.02; 198/370.01; 198/370.07; 209/657; 209/916

(58) Field of Classification Search ................ 198/367, 198/370.02, 370.07, 367.1; 209/540, 583, 209/584, 658, 657, 916
See application file for complete search history.

(56) References Cited

U.S. PATENT DOCUMENTS

| | | | | | |
|---|---|---|---|---|---|
| 2,993,583 | A | * | 7/1961 | Sykes | 198/370.07 |
| 3,033,366 | A | * | 5/1962 | Atanasoff et al. | 209/562 |
| 3,045,801 | A | * | 7/1962 | Graybeal | 198/370.07 |
| 3,071,239 | A | * | 1/1963 | Burtness | 198/370.07 |
| 3,110,383 | A | * | 11/1963 | Holben | 198/563 |
| 3,173,534 | A | * | 3/1965 | Atanasoff | 198/747 |
| 3,246,733 | A | * | 4/1966 | Walter et al. | 198/370.07 |
| 3,515,254 | A | * | 6/1970 | Gary | 198/502.2 |
| 3,642,117 | A | * | 2/1972 | Burt | 198/38 |
| 3,955,678 | A | * | 5/1976 | Moyer | 209/74 |
| 4,711,357 | A | * | 12/1987 | Langenbeck et al. | 209/565 |
| 4,717,011 | A | * | 1/1988 | Yu et al. | 198/370.02 |
| 4,732,259 | A | * | 3/1988 | Yu et al. | 198/368 |
| 4,732,260 | A | * | 3/1988 | Canziani | 198/365 |
| 4,884,677 | A | * | 12/1989 | Yu et al. | 198/370.02 |
| 4,896,760 | A | * | 1/1990 | Triantafilou et al. | 198/370.02 |
| 5,613,591 | A | * | 3/1997 | Heit et al. | 198/370.02 |
| 5,620,102 | A | * | 4/1997 | Finch, Jr. | 209/583 |
| 5,868,239 | A | * | 2/1999 | Bonnet | 198/370.02 |
| 5,887,699 | A | * | 3/1999 | Tharpe | 198/367 |
| 5,921,740 | A | * | 7/1999 | Stewart | 414/399 |
| 5,971,132 | A | * | 10/1999 | Bonnet | 198/370.07 |
| 6,005,211 | A | * | 12/1999 | Huang et al. | 209/583 |
| 6,036,128 | A | * | 3/2000 | Cramer | 241/185.5 |
| 6,041,909 | A | * | 3/2000 | Shearer, Jr. | 198/370.02 |
| 6,189,702 | B1 | * | 2/2001 | Bonnet | 209/651 |
| 6,236,008 | B1 | * | 5/2001 | Bonnet | 209/583 |
| 6,318,539 | B1 | * | 11/2001 | Bonnet | 198/370.02 |
| 6,769,536 | B2 | * | 8/2004 | Lutz | 198/861.1 |
| 6,814,216 | B2 | * | 11/2004 | Veit et al. | 198/370.02 |

* cited by examiner

*Primary Examiner*—Khoi H Tran
(74) *Attorney, Agent, or Firm*—Greenblum & Bernstein, P.L.C.

(57) ABSTRACT

A bi-directional package divert mechanism used for sorting mail and other packages and items into appropriate bins for future delivery. The mechanism includes a downward extending moving mechanism which is capable of moving items into one of two directions, both perpendicular to an original direction of travel. Sensors are provided which detect a position of the moving mechanism, items for moving and monitoring of other systems.

28 Claims, 6 Drawing Sheets

BI-DIRECTIONAL PACKAGE DIVERT MECHANISM AND METHOD OF USE

BACKGROUND OF THE INVENTION

1. Field of the Invention

The present invention generally relates to a package divert mechanism and method of use and, more particularly, to a bi-directional package divert mechanism used for sorting mail and other packages and items into appropriate bins for future delivery.

2. Background Description

In most modem postal facilities, major steps have been taken toward mechanization (e.g., automation) of the delivery of mail, packages and other items. These machines and technologies include, amongst others, letter sorters, facer-cancelers, automatic address readers, parcel sorters, advanced tray conveyors, flat sorters, letter mail coding and stamp-tagging techniques and the like. As a result of these developments, postal facilities have become quite automated over the years, considerably reducing overhead costs.

In use, these machines and technologies such as sorting machines (FSM) are capable of processing more than 10,000 packages per hour by electronically identifying and separating prebarcoded mail, handwritten letters, and machine-imprinted pieces. Computer-driven single-line optical character readers (OCR) are used in this process.

However, the actual physical sorting (i.e., diverting) of the packages is quite difficult, and in many instances not very efficient. To start, for example, packages or other items may be placed on an introduction conveyer where they are initially scanned. After being scanned, the packages are then introduced onto an accumulation conveyer and thereafter are transported to a scanner array where each item is individually scanned by the scanner array. Once each item is individually scanned, they are then sorted or diverted into separated bins for future delivery. The diversion of the items into the separate bins is typically based on criteria such as, for example, zip code or other destination criteria which was read by the scanners.

To actually divert the items, several different types of divert mechanisms have been used, each with their own shortcomings. These mechanisms include, amongst others, air cylinders, traverse rollers, cross belt technology and the like. Taking the case of air cylinders, for example, it is well known that the use of air cylinders requires large compressors which have extensive plumbing needs. These large compressors also utilize a large amount of energy, especially for moving or diverting large packages. In use, these air cylinders are also very difficult to control and, in some instances, may needlessly output large amounts of compressed air for even the smallest of packages or items. It is further known that compressed air may not be adequate, even at very high pressures, to divert large, heavy packages. In this scenario, the large, heavy packages may not be properly diverted to an appropriate bin or, alternatively, must be manually placed in the appropriate bin thereby increasing overhead labor costs.

With other diverting mechanisms such as cross belt technology and traverse rollers, all of the packages may not be properly diverted. Also, these mechanisms are not the most efficient diverting mechanisms and have a tendency to allow the packages, mail and other items to either accumulate at certain areas on the conveyer causing a bottleneck, or simply not divert the package in the proper bin for various known reasons.

The present invention is designed to overcome the shortcomings of the known diverting mechanisms.

SUMMARY OF THE INVENTION

In a first aspect of the invention, a package divert mechanism is provided. In this aspect, a frame member is adapted for use with an existing conveyor system. A moveable diverting mechanism extends from the frame member and is moveable in at least one direction substantially perpendicular to an original direction of travel of an item being transported on the conveyor system. The moveable diverting mechanism is capable of diverting the item being transported on the conveyor system to the least one direction substantially perpendicular to the original direction of travel of the item.

In embodiments, the at least one direction is a first direction and a second opposing direction, both substantially perpendicular to the original direction of travel of the item. In further embodiments, the moveable diverting mechanism includes a downward extending blade having a first surface and a second surface and a longitudinal axis. The first and second surfaces face opposing directions substantially perpendicular to the original direction of travel of the item, and the longitudinal axis is substantially parallel to the original direction of travel of the item. A plurality of sensors associated with the moveable diverting mechanism is also provided. These sensors may include, for example, (i) an over current sensor, (ii) at least one home sensor, (iii) at least one over travel sensor, (iv) at least one photosensor and (v) at least one interlock switch for detecting a position of safety hoods.

In another aspect of the present invention, the bidirectional divert mechanism includes a frame having an entrance and a plurality of exits, and a gliding mechanism extending across a frame member of the frame. A downward extending moveable blade member is coupled to the gliding mechanism, and includes opposing blade surfaces and a longitudinal axis. The opposing blade surfaces face opposing exits and the longitudinal axis extends in a direction between the entrance and another of the exits. In embodiments of the second aspect, a host of sensors are also provided, similar to that of the first aspect of the present invention.

In a third aspect of the present invention, a method of diverting an item is provided. The method includes locating a first home position and a second home position of a diverting mechanism, and positioning the diverting mechanism at one of the first home position and the second home position. A determination is then made as to a diverting direction of the item which is based on classification information associated with the item. The diverting mechanism is then in accordance with the diverting direction. This control may include, for example, (i) moving the diverting mechanism in a first direction which is substantially perpendicular to an original direction of travel of the item; (ii) moving the diverting mechanism in a second direction opposite the first direction; or (iii)

allowing the diverting mechanism to remain stationary in order to allow the item to pass through unimpeded.

The method, in embodiments, may also include detecting when an item is jammed or exceeds a threshold physical characteristic limit, as well as whether the diverting mechanism has exceeded a travel limit or an operator has open access to the diverting mechanism. In any one of these cases, the movement of the diverting mechanism may be suspended.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The present invention is directed to a bi-directional package divert mechanism and method of use. In this system, mailpieces of various sizes and weights may be easily and efficiently diverted into sorting bins during the sorting process. By way of illustrative example, the bi-directional package divert mechanism of the present invention may divert mailpieces from ¾ inches thick at various aspect ratios to 36"×36"×36" packages to items weighing upwards of 70 or more pounds. Of course, the bi-directional package divert mechanism of the present invention may also be configured to accommodate other sized packages, mailpieces and items, depending on the particular desired application. The bi-directional package divert mechanism preferably has a minimum throughput of 12 pieces per minute and is designed in a modular format to easily mount to an already existing conveyor system. The system of the present invention also includes a bi-directional diverting control system which is easily integrated with other control systems, interfacing with other PC controllers, via an open device level network protocol and modular architecture. The control system also preferably includes plug and play features.

Bi-directional Package Divert Mechanism of the Present Invention

Figure 1:
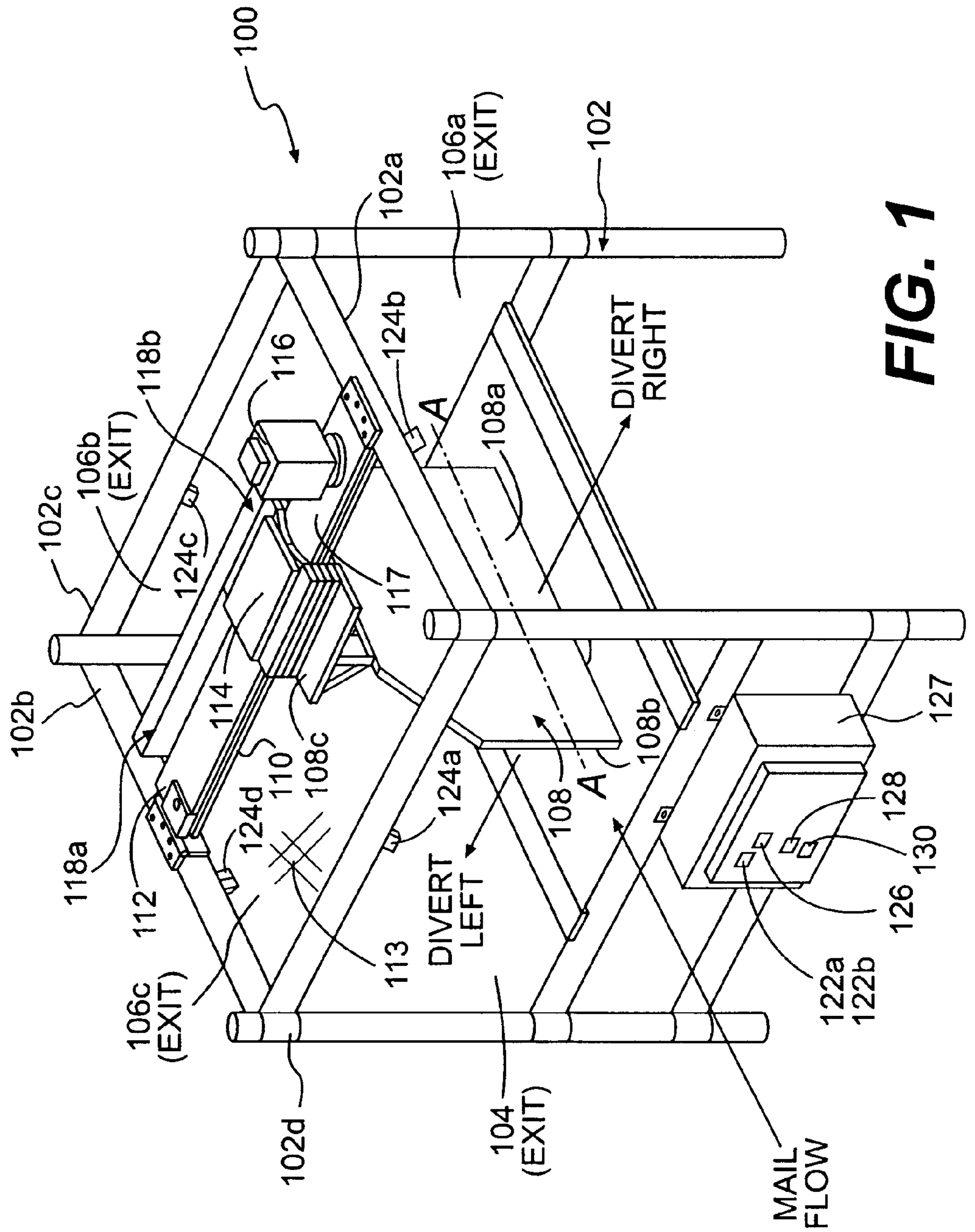
FIG. 1 is a perspective view of the bi-directional package divert mechanism of the present invention.
Figure 4:
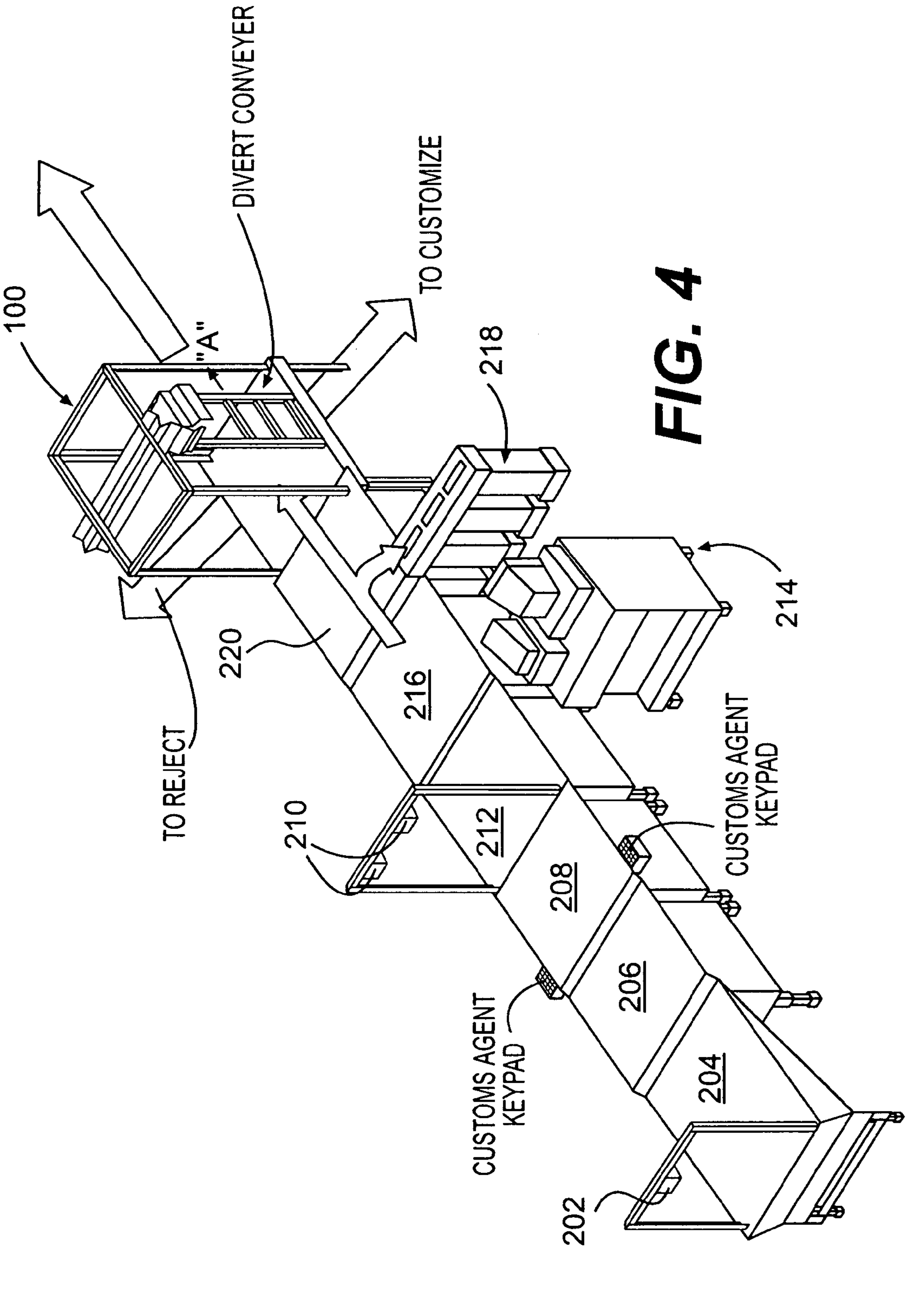
FIG. 4 shows a perspective view of one type of conveyor system used with the bi-directional package divert mechanism of the present invention.

Referring now to FIG. 1, a schematic diagram of a bi-directional package divert mechanism of the present invention is shown. In this embodiment, the bi-directional package divert mechanism is depicted generally as reference numeral 100 and includes a modular frame 102 which is adapted to be used with existing conveyor systems. The modular frame 102 may, of course, be of various different sizes and shapes, depending on the particular conveyor system used with the present system. The frame 102 includes an entrance 104 and three exits 106*a,* 106*b* and 106*c*. The entrance 104 and exit 106*b* are adapted to be in substantial alignment with a conveyer (as shown in FIG. 4) of the existing conveyor system. Additionally, the entrance 104 and exits 106*a,* 106*b* and 106*c* are, in embodiments, sized to allow ingress and egress of various sized packages upwards of 36"×36"×36" and weights of 70 or more pounds. Of course, the entrance 104 and exits 106*a,* 106*b* and 106*c* may accommodate larger or smaller packages depending on the particular application.

Still referring to FIG. 1, a moveable blade 108 extends within the modular frame 100 and includes opposing surfaces 108*a* and 108*b* and an upper mounting surface 108*c*. The moveable blade 108 extends downward from a substantially centrally located guide rail 110 and track 112 system, extending between opposing frame members 102*a* and 102*b* of the modular frame 102. A longitudinal axis "A-A" of the moveable blade 108 is substantially aligned with a travel of transport of items on the conveyor; whereas, the facing surfaces 108*a* and 108*b* are substantially perpendicular thereto. A gliding mechanism 114 is slidably mounted to the track 112 and is further mounted to the upper mounting surface 108*c* of the blade 108. In this manner, the moveable blade 108 is capable of moving between (i.e., towards and away) the exits 106*a* and 106*c* by gliding along the track 112 of the centrally located guide rail 110. Accordingly, in use, the moveable blade 108 is capable of diverting packages substantially perpendicular to the entrance 104 and exit 106*b*. In embodiments, covers 113 are provided over the frame members to protect operators during the operation of the present invention.

FIG. 1 further shows a motor 116 mounted on the centrally located guide rail 110. The motor 116, which in embodiments may be a stepper motor, drives a linear actuator 117 which provides linear motion to the moveable blade 108, via the gliding mechanism 114, along the track 112. The linear actuator 117 may, in embodiments, move in tandem with the moveable blade 108. A first and second home sensor 118*a* and 118*b* as well as a first and second over travel sensor 120*a* and 120*b* are also positioned on or proximate the centrally located guide rail 110. The home sensors 118*a* and 118*b* the over travel sensors 120*a* and 120*b* are, in embodiments, proximity sensors which monitor or detect the position of the moveable blade 108. The proximity sensors may be any type of proximity sensor such as, for example, an inductive or magnetic based proximity sensor. By illustrative example, the home sensors 118*a* and 118*b* are designed to detect the position of the moveable blade 108 between a first or second position with respect to sides of the conveyer. The over travel sensors 120*a* and 120*b,* on the other hand, are designed to detect an over travel of the moveable blade 108. A stepper motor 116 may be used which would, in embodiments, eliminate the need for the home and over travel sensors.

Additionally, momentary contact relays 122*a* and 122*b* are associated with a control box 127 for providing an input signal to the motor 116. These control signals may be termed "divert left" and "divert right" signals. These control signals may be based on various package features such as, for example, postage, weight, delivery information and the like. In this manner, the movement of the moveable blade 108 is controlled via the linear actuator 117 (as discussed in more detail below). The momentary contact relays 122*a* and 122*b* are respectively termed "divert right" and "divert left". In embodiments, the momentary contact relays 122*a* and 122*b* may be controlled by input signals received from a control system of an already existing conveyor system such as, for example, a controller 214 of FIG. 4

A potentiometer 126, control system 128 and an over current sensor 130 may also be associated with the motor 116, all of which may be mounted within the control box 127. The potentiometer 126 and over current sensor 130 may be hardware or software implemented features. The potentiometer 126 adjusts or controls a speed of the motor 116 and hence the speed of the moveable blade 108. The over current sensor 130, on the other hand, monitors a current associated with the motor 116, and will provide an input signal to shut down the system if a current exceeds a predetermined threshold. This may occur when packages are "jammed" or if a weight of the package exceeds a threshold limit. The control system 128 is designed to control the system of the present invention and, in particular, is designed to interface with the sensors discussed herein as well as a controller of an already existing conveyor systems (see, FIG. 4).

At least one photosensor 124*a*, 124*b*, 124*c* and 124*d* is positioned on cross bars of the modular frame 102. The photosensor 124*a* is used to detect a flow of a package entering into the system of the present invention. On the other hand, the photosensors 124*b*, 124*c* and 124*d* monitor the flow of packages exiting the bi-directional divert mechanism 100 of the present invention. By monitoring the flow of packages exiting the system, it can now be easily determined whether the packages were properly diverted into the appropriate bin for future delivery.

Figure 2:
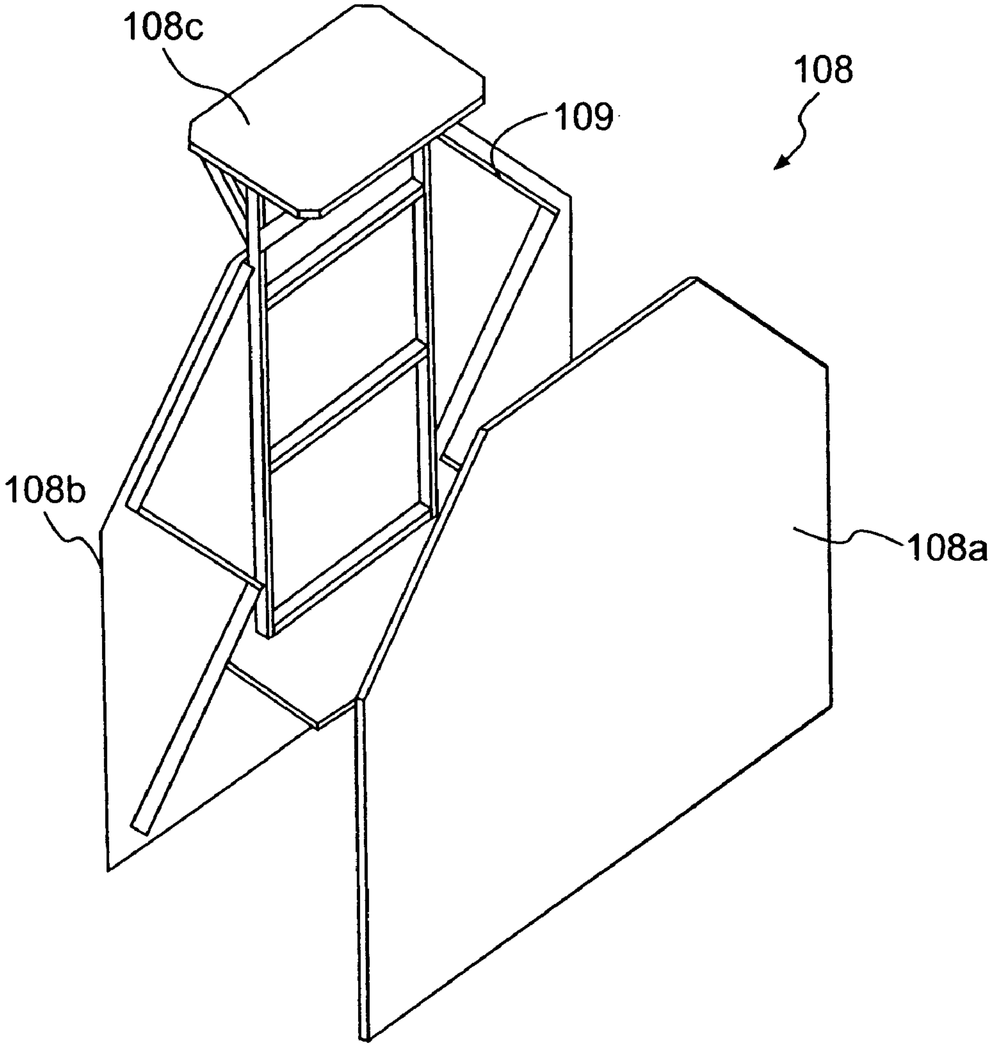
FIG. 2 shows a moveable blade mechanism used with the bi-directional package divert mechanism of the present invention.

FIG. 2 shows the components of the moveable blade 108. The moveable blade 108 includes a first surface 108*a* and a second surface 108*b*. The first and second surfaces 108*a* and 108*b* have a surface area large enough to divert or push various sized packages upwards of 36"×36"×36" and weights of 70 or more pounds. Of course, the above example is merely provided for illustrative purposes, and is not to be considered a design limitation. The moveable blade 108 also includes a mounting surface 108*c*. The mounting surface is preferably designed to couple with the gliding mechanism 114. An internal framework 109 may also be provided to add rigidity and strength to the moveable blade 108.

Figure 3:
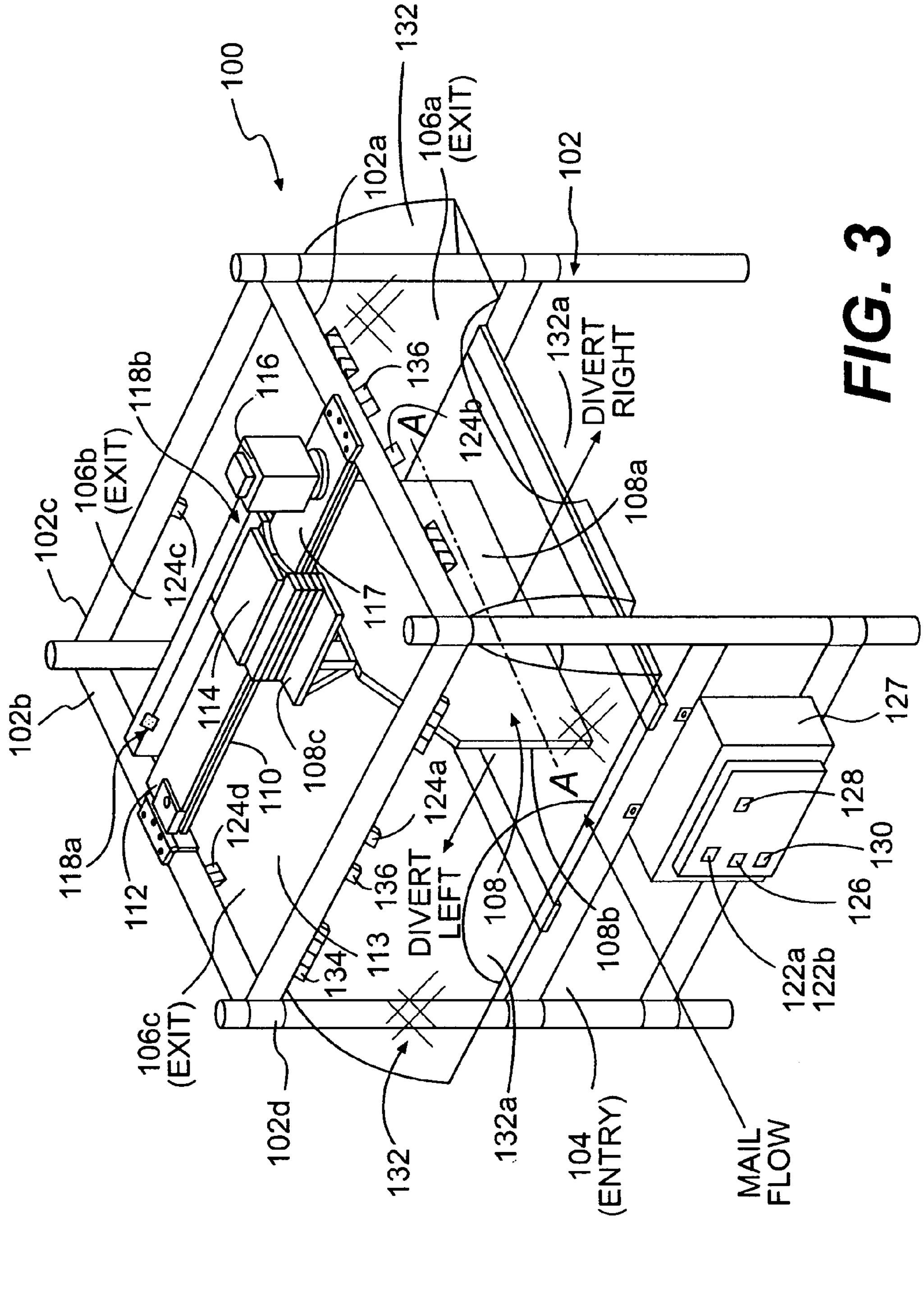
FIG. 3 shows a perspective view of an alternative bidirectional package divert mechanism of the present invention.

FIG. 3 shows an alternative embodiment of the present invention. In this embodiment, hoods (i.e., safety covers) 132 are hinged mounted at the entrance 104 and each of the exits 106*a*, 106*b* and 106*c*. The hoods 132 each include an opening 126*a* for allowing packages to ingress and egress from the entrance 104 and each of the exits 106*a*, 106*b* and 106*c*. The openings 132*a* may be of various different sizes and shapes with the only limitation that such openings 132*a* allow packages to enter and exit the system of the present invention. Accordingly, by illustration, the openings 132*a* may be sized and shaped so as to accommodate packages or other items which are upwards of 36"×36"×36" and weights of 70 or more pounds.

The hoods 132 are mounted to respective frame members 102*a*, 102*b*, 102*c* and 102*d* via hinges 134. A plurality of sensors or interlock switches 136 are placed along the cross members 102*a*, 102*b*, 102*c* and 102*d* for detecting the position of the hoods 132. The interlock switches 136 provide a shut off signal to the control system 128 when any of the hoods 132 are in an upright or open position. This provides a safety mechanism so that an operator cannot open any of the hoods 136 and access the interior portion of the system 100 during operational use.

FIG. 4 shows a perspective view of the bi-directional package divert mechanism 100 used with an existing conveyor. In this representation, the conveyor is depicted generally as reference numeral 200 and includes several known components such as, for example:

(i) an introduction scanner 202;

(ii) an induction conveyor 204;

(iii) an accumulation conveyor 206;

(iv) a determination conveyor 208;

(v) an individual item scanner array 210;

(vi) a scan conveyor 212;

(vii) a combination label printer, stack light and controller cabinet with workstation 214;

(viii) a label conveyor 216;

(ix) a mail sorter 218; and (x) a guard conveyor 220.

In the configuration shown in FIG. 4, the bi-directional package divert mechanism 100 is in alignment with the conveyors and is capable of being adapted to be positioned along any location thereof. This is due to the modular configuration of the bi-directional package divert mechanism 100 of the present invention. As seen in the representation of FIG. 4, the longitudinal axis "A-A" of the moveable blade 108 is substantially aligned with a travel of transport of items on the conveyor; whereas, the facing surfaces 108*a* and 108*b* are substantially perpendicular thereto. In embodiments, the control system 128 of the bidirectional package divert mechanism 100 interfaces with the controller 214 of the general overall system 200. This allows the control system 128, and more generally the bi-directional package divert mechanism 100, to interact with the overall conveyor system 200. In preferred embodiments, the control system 128 receives signals from the controller 214 of the existing conveyer system 200 in order to provide instructions for the diverting and overall system functionality of the bidirectional package divert mechanism 100.

Method of Using the Present Invention

Figure 5:
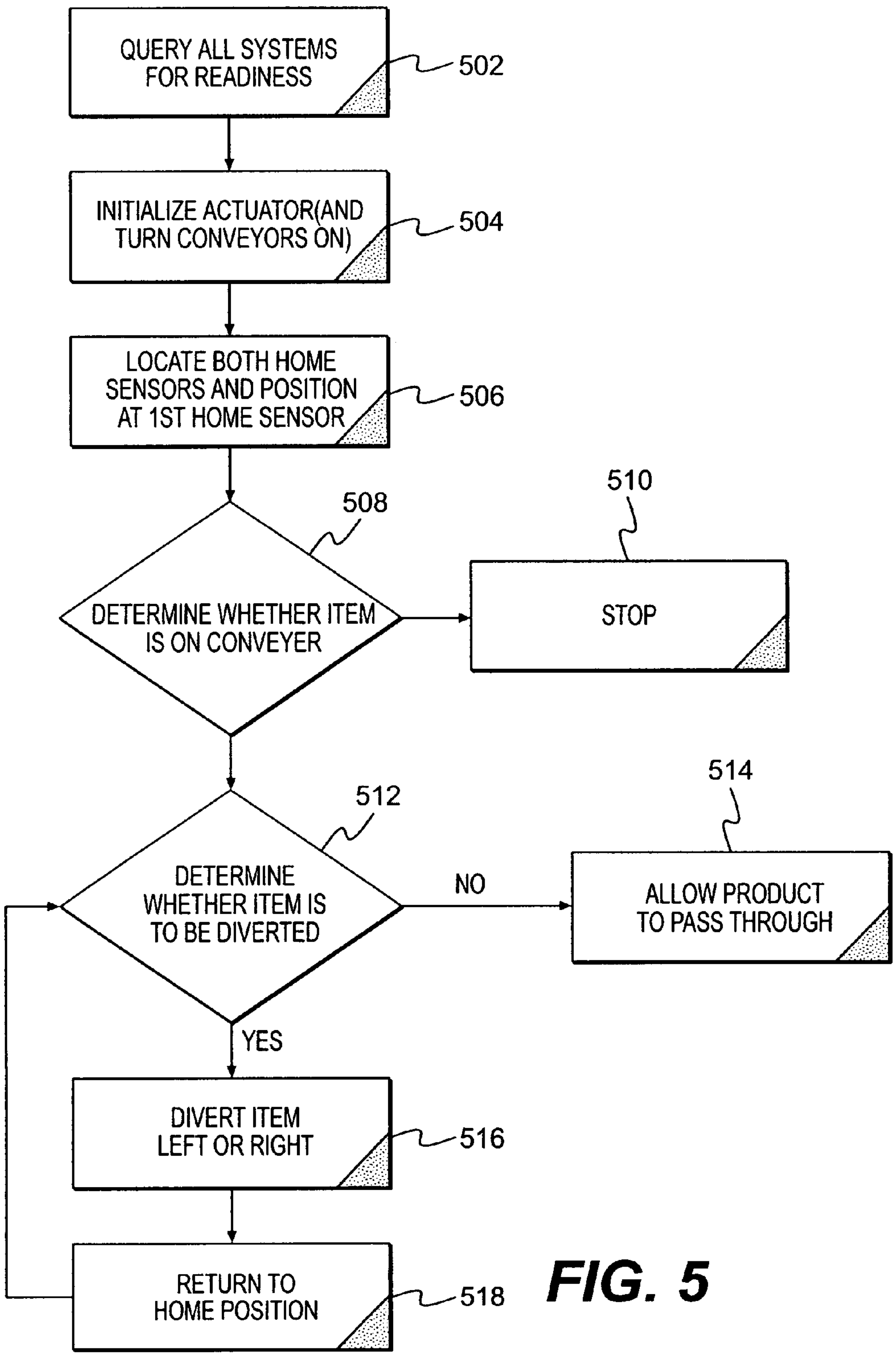
FIG. 5 is a flow diagram showing the steps of implementing the method of the present invention.

FIGS. 5 though 8 are flow diagrams showing the steps of implementing the method of the present invention. FIGS. 5 though 8 may equally represent a high level block diagram of the system of the present invention, implementing the steps thereof. The steps of the present invention may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network.

Now referring to FIG. 5, a flow diagram of the method of the present invention is shown. In step 502, the control provides a ready query to the system of the present invention. In embodiments, this readiness query may be provided to the overall system as shown in FIG. 4 (or other configurations). Once the systems are ready, the actuator will be initialized and, in embodiments, the conveyer will begin to run, in step 504. In step 506, the system of the present invention will locate both home positions and position the moveable blade at one of the home positions (i.e., at a first home sensor). It should be well understood that the moveable blade can either be positioned at the home sensor 118*a* or 118*b*. In further embodiments, a determination will be made, in step 508, as to whether any items are on the conveyor. If not, the bi-directional package divert mechanism 100 will stop at step 510. If there are items on the conveyor, which can be determined using the photosensor or other sensor, a determination is made as to whether the item should be diverted towards a first direction, a second direction (both substantially perpendicular to the travel of the conveyor) or should simply pass through the system of the present invention (step 512). This determination may be made using information obtained from scanners, logic of the conveyor system and/or a predetermined sorting plan of the present invention.

If the item is to pass through then, in step 514, the item will pass through without the activation or movement of the moveable blade. If the item is to be diverted, in step 516, the moveable blade will be activated and either move towards a first direction or a second direction, depending on the predetermined diverting direction. In this manner, the item will be diverted to either the first or second direction, depending on the control signals received from the controller 214, the control system 128 or other determining mechanism. Once the item is properly diverted, the control will determine the position of the moveable blade and then "allocate" a new home position while returning to step 512, which may be the original home position thereby resulting in no movement of the moveable blade.

To further illustrate some of the steps of FIG. 5, it should be noted that the motor, which drives the linear actuator, will respond to the signal from the first momentary contact relay when the linear actuator is positioned at the first home sensor. Said otherwise, the linear actuator will respond to the signal from the divert left momentary contact relay (i.e., momentary contact relay 122*b*) when the linear actuator is positioned at the home sensor 118*a*. Likewise, when the linear actuator is positioned at the home sensor 118*b*, the motor will respond to the signal from the divert right momentary contact relay (i.e., momentary contact relay 122*a*).

Figure 6:
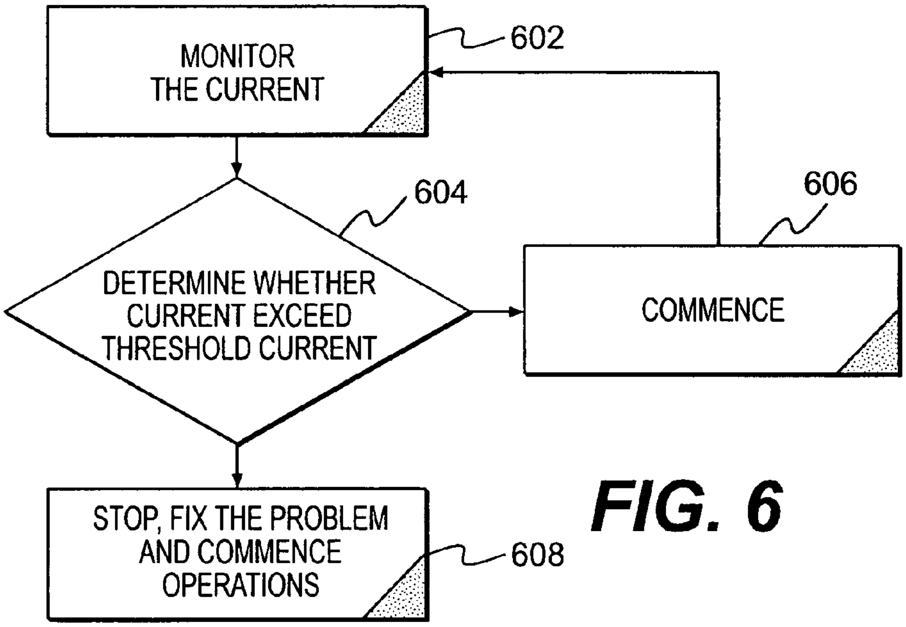
FIG. 6 is a flow diagram showing the sub steps of implementing the method of the present invention.

FIG. 6 shows a sub system of the system of the present invention. In this sub system, a safety determination is made in order to cease all operations when one or more items become jammed or an object is too large or heavy for the design parameters of the present system. Specifically, in step 602, the system of the present invention monitors the current associated with the actuator of the present invention. In step 604, a determination is made as to whether a current exceeds a threshold current. If not, in step 606, the system continues with the steps of FIG. 5. However, if the current exceeds the threshold current, the control will provide a signal to the systems of the present invention in order to shut down, in step 608. Once the problem is rectified, e.g., the items are no longer jammed or a large, heavy item is moved from the bi-directional package divert mechanism 100, the control will provide a signal to commence operations, and return to step 602 for continued monitoring. The commencement of the operational functions may be, in embodiments, implemented by operator input.

The shutdown safety feature may equally be utilized, in embodiments, based on the signals received from the photosensors, over travel sensor, interlock switches or other sensors. By way of example, the bi-directional package divert mechanism 100 may be shutdown if the photosensors detect a jam at the entrance or exit. Additionally, the bi-directional package divert mechanism 100 may be shutdown when the interlock switches detect that one of the hoods is in an upright or open position.

Figure 7:
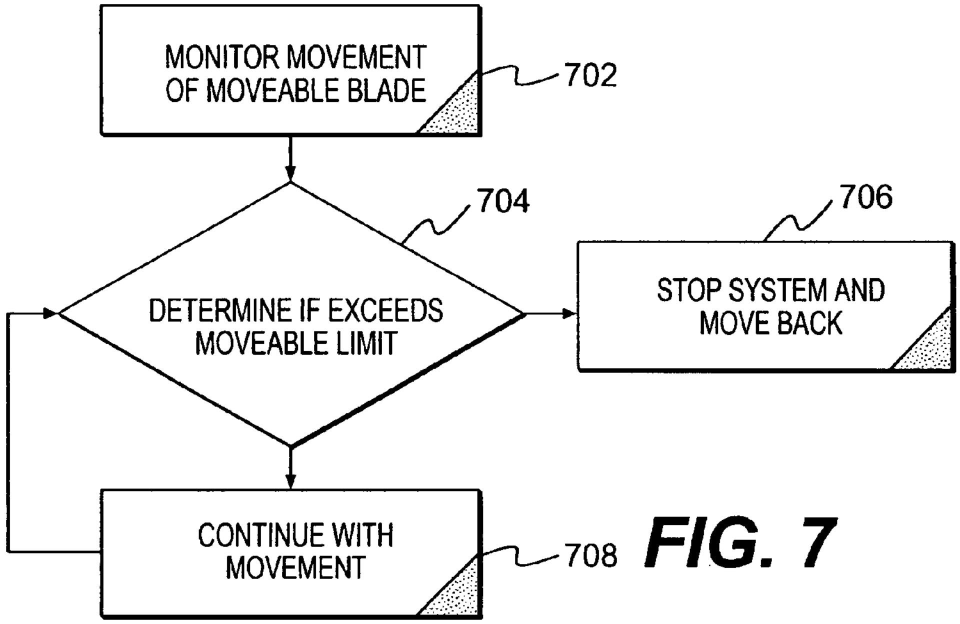
FIG. 7 is a flow diagram showing the sub steps of implementing the method of the present invention.

FIG. 7 shows the embodiment when the over travel sensors detect an over travel of the moveable blade. In step 702, the control monitors the movement of the moveable blade. In step 704, a determination is made as to whether the moveable blade exceeds a threshold limit. That is, whether the moveable blade traveled too far in either direction. If so, the over travel sensor provides a control signal to the linear actuator which, in turn, stops or suspends the movement of the moveable blade and reverses its direction until the moveable blade is in a proper position (step 706). Otherwise, in step 708, the moveable blade will continue its movement in the same direction. The control returns to step 702 for continued monitoring of the position of the moveable blade.

In embodiments, a stepper motor may instead be used. By counting the increments of the stepper motor, a determination of the home position and any over travel position may also be monitored or detected.

While the invention has been described in terms of preferred embodiments, those skilled in the art will recognize that the invention can be practiced with modification within the spirit and scope of the appended claims.

The invention claimed is:

1. A package divert mechanism, comprising:

a frame adapted for use with an existing conveyor system for transporting an item in an original direction, said frame including a frame entrance and a plurality of frame exits;

at least one of the frame exits being perpendicular to the frame entrance; and a moveable diverting mechanism extending from the frame, the moveable diverting mechanism being movable substantially perpendicular to the original direction of travel of the item being transported on the existing conveyor system and diverting the item in either a first direction or a second opposing direction with respect to the first direction, wherein the movable diverting mechanism is capable of remaining in a static position allowing the item to pass through the package divert mechanism while moving along the original direction.

2. The package divert mechanism of claim 1, wherein:

the moveable diverting mechanism is a bi-directional moveable diverting mechanism; and the first direction and the second opposing direction are both substantially perpendicular to the original direction of travel of the item.

3. The package divert mechanism of claim 1 wherein the moveable diverting mechanism is configured to remain stationary so that the item can pass therethrough.

4. The package divert mechanism of claim 1, wherein the moveable diverting mechanism includes a downward extending blade having a first surface adapted for diverting the item and a longitudinal axis, the first and second surfaces facing opposing directions substantially perpendicular to the original direction of travel of the item and the longitudinal axis being substantially parallel to the original direction of travel of the item.

5. The package divert mechanism of claim 1, wherein the moveable diverting mechanism further includes a moving mechanism for moving the moveable diverting mechanism.

6. The package divert mechanism of claim 5, wherein the moving mechanism includes an actuator and a gliding mechanism.

7. The package divert mechanism of claim 1, further comprising:

a frame member of the frame, a mounting mechanism of the moveable diverting mechanism, and a gliding mechanism extending from the frame member and connected to the mounting mechanism of the moveable diverting mechanism.

8. A package divert mechanism, comprising:

a frame adapted for use with an existing conveyor system for transporting an item in an original direction;

a moveable diverting mechanism extending from the frame member, the moveable diverting mechanism being movable substantially perpendicular to the original direction of travel of the item being transported on the existing conveyor system and diverting the item in either a first direction or a second opposing direction; and an over current sensor for determining whether a current associated with an actuator exceeds a threshold limit, wherein the moveable diverting mechanism further includes a moving mechanism for moving the moveable diverting mechanism.

9. The package divert mechanism of claim 1, further comprising a plurality of sensors associated with the moveable diverting mechanism.

10. A package divert mechanism, comprising:

a modular frame adapted for use with an existing conveyor system for transporting an item in an original direction;

a moveable diverting mechanism extending from the modular frame, the moveable diverting mechanism being movable substantially perpendicular to the original direction of travel of the item being transported on the existing conveyor system and diverting the item in either a first direction or a second opposing direction; and a plurality of sensors associated with the moveable diverting mechanism, wherein the plurality of sensors include:

at least one home sensor for detecting a home position of the moveable diverting mechanism; and at least one over travel sensor for detecting an over travel position of the moveable diverting mechanism; and a plurality of sensors associated with the modular frame for detecting a flow of the items entering an entrance of the modular frame and exiting an exit of the modular frame.

11. A package divert mechanism, comprising:

a frame adapted for use with an existing conveyor system for transporting an item in an original direction;

a moveable diverting mechanism extending from the frame, the moveable diverting mechanism being movable substantially perpendicular to the original direction of travel of the item being transported on the existing conveyor system and diverting the item in either a first direction or a second opposing direction;

momentary contacts associated with a control box arranged on the frame which provide an input signal to control the movement of the moveable diverting mechanisms; and a control system that determines information from the item and predetermines a diverting direction for the item, wherein the item is moved with the movable diverting mechanism in the first direction based on a first control signal and in the second direction based on a second control signal.

12. A package divert mechanism, comprising:

a frame member adapted for use with an existing conveyor system for transporting an item in an original direction;

a moveable diverting mechanism extending from the frame member, the moveable diverting mechanism being movable substantially perpendicular to the original direction of travel of the item being transported on the existing conveyor system and diverting the item in either a first direction or a second opposing direction; and hoods having openings, the hoods being positioned at an entrance and each exit of the frame.

13. The package divert mechanism of claim 12, further comprising at least one interlock switch for detecting a position of the hoods and providing a signal to a controller for shutting down movement of the moveable diverting mechanism when any of the hoods are in an upright position.

14. A bidirectional divert mechanism, comprising:

a frame having first, second, third, and fourth frame members each connected to a fifth frame member;

the first and second frame members defining an entrance, the second and third frame members defining a first of a plurality of exits, the third and fourth frame members defining a second of the plurality of exits, and the fourth and first frame members defining a third of the plurality of exits;

a gliding mechanism extending across the fifth frame member of the frame and adapted to move between opposing exits of the plurality of exits;

a downward extending moveable blade member coupled to the gliding mechanism, the downward extending blade member having opposing blade surfaces to divert an item in either a first direction or a second direction opposing the first direction, and further having a longitudinal axis, the opposing blade surfaces facing opposing exits and the longitudinal axis extending in a direction between the entrance and another of the exits; and a means for positioning the movable blade member in a static position allowing the item to pass through the bidirectional divert mechanism.

15. The bidirectional divert mechanism of claim 14, further comprising a series of sensors for monitoring or controlling actions of the downward extending moveable blade member.

16. The bi-directional divert mechanism of claim 15, wherein the series of sensors includes at least one of:

at least one home sensor for detecting a home position of the downward extending moveable blade member;

at least one over travel sensor for detecting an over travel position of the downward extending moveable blade member; at least one photosensor for detecting a flow of items;

an over current sensor for determining whether a current associated with an actuator of the downward extending moveable blade member exceeds a threshold limit; and momentary contacts which provide an input signal to control the movement of the downward extending moveable blade member.

17. A package divert mechanism, comprising:

a frame having an entrance and a plurality of exits;

a gliding mechanism extending across a frame member of the frame and adapted to move between opposing exits of the plurality of exits;

a downward extending moveable single blade member coupled to the gliding mechanism, the downward extending single blade member having opposing blade surfaces and a longitudinal axis, the opposing blade surfaces facing opposing exits and the longitudinal axis extending in a direction between the entrance and another of the exist, a safety hood positioned at least at one of the entrance and exits of the frame; and a control system that determines information from an item and predetermines a diverting direction for the item.

18. A method of diverting an item, comprising:

locating a first home position and a second home position of a diverting mechanism having a blade;

allowing the blade to move within a frame having a plurality of vertical frame members which define a frame entrance and at least first and second frame exits which are arranged orthogonal to one another;

positioning the diverting mechanism at one of the first home position and the second home position;

determining a diverting direction of the item based on classification information associated with the item; and controlling, with control signals received from a controller of a conveyor, the diverting mechanism in accordance with the diverting direction to divert an item in either the first frame exit or the second frame exit.

19. The method of claim 18, wherein the controlling includes:

moving the diverting mechanism in a first direction in order to divert the item in the first direction which is substantially perpendicular to an original direction of travel of the item;

moving the diverting mechanism in a second direction opposite the first direction; and allowing the diverting mechanism to remain stationary in order to allow the item to pass through unimpeded.

20. The method of claim 19, further comprising determining and allocating a new home position of the diverting mechanism after the controlling.

21. The method of claim 18, further comprising suspending movement of the diverting mechanism based on at least one of:

a detection of an item being jammed;

a detection of an item exceeding a threshold physical characteristic limit;

a detection that the diverting mechanism exceeds a travel limit; and a detection that an operator has open access to the diverting mechanism.

22. A method of diverting an item, comprising:

locating a first home position and a second home position of a diverting mechanism;

positioning the diverting mechanism at one of the first home position and the second home position;

determining a diverting direction of the item based on classification information associated with the item; and controlling the diverting mechanism in accordance with the diverting direction; and suspending the movement of the diverting mechanism based on at least one of:

a detection of an item being jammed;

a detection of an item exceeding a threshold physical characteristic limit;

a detection that the diverting mechanism exceeds a travel limit; and a detection that an operator has open access to the diverting mechanism, wherein the detection of the jammed item and the detection of the item exceeding a threshold physical characteristic limit is based on a detection of an over current of an actuator which moves the diverting mechanism.

23. The package divert mechanism of claim 1, wherein the movable diverting mechanism includes a blade mechanism extending from the frame member to divert the item in either the first direction or the second opposing direction.

24. The package divert mechanism of claim 8, wherein an excessive current associated with the actuator indicates that the existing conveyor system should be stopped.

25. The package divert mechanism of claim 1, wherein the frame member includes a plurality of legs forming the entrance and the plurality of exits, wherein:

a first leg and a second leg form the entrance;

a third leg and the first leg form a first exit of the plurality of exits, the first exit being orthogonal to the entrance;

a fourth leg and the second leg form a second exit of the plurality of exits, the second exit being orthogonal to the entrance; and the third leg and the fourth leg form a third exit of the plurality of exits, the third exit being in alignment with the entrance.

26. The package divert mechanism of claim 25, further comprising:

a first hood mounted over the first exit via a first hinge;

a second hood mounted over the second exit via a second hinge;

a third hood having mounted over the third exit via a third hinge; and a fourth hood mounted over the entrance via a fourth hinge.

27. The package divert mechanism of claim 1, further comprising a control system that determines information from the item and predetermines a diverting direction for the item, wherein the item is moved with the movable diverting mechanism in the first direction based on a first control signal and in the second direction based on a second control signal.

28. The bidirectional divert mechanism of claim 14, further comprising a control system that determines information from the item and predetermines a diverting direction for the item, wherein the item is moved with the movable blade member in the first direction based on a first control signal and in the second direction based on a second control signal.

* * * * *